INVENTOR
GLENN H. MUSSELMAN

ATTORNEY

July 21, 1953

G. H. MUSSELMAN 2,646,510

SYSTEM FOR SYNCHRONIZING SERIES
OF RECURRING PULSE EMISSIONS

Original Filed June 13, 1945

INVENTOR
GLENN H. MUSSELMAN

BY
ATTORNEY

July 21, 1953

G. H. MUSSELMAN 2,646,510

SYSTEM FOR SYNCHRONIZING SERIES
OF RECURRING PULSE EMISSIONS

Original Filed June 13, 1945

INVENTOR
GLENN H. MUSSELMAN

ATTORNEY

Patented July 21, 1953

2,646,510

UNITED STATES PATENT OFFICE 2,646,510

SYSTEM FOR SYNCHRONIZING SERIES OF RECURRING PULSE EMISSIONS

Glenn H. Musselman, Boston, Mass., assignor, by mesne assignments, to the United States of America as represented by the Secretary of the Navy Original application June 13, 1945, Serial No. 599,163. Divided and this application September 18, 1945, Serial No. 617,146

10 Claims. (Cl. 250—36)

This invention relates to a means for maintaining a recurrent series of pulse emissions from a first radio transmitter in a known time relation with a similarly recurrent series of pulse emissions from a second radio transmitter.

In patent application Serial No. 599,163 filed June 13, 1945 of J. A. Pierce, D. E. Kerr, and J. C. Street is disclosed a long range navigation system which enables a navigator to locate himself on the surface of the earth. This system comprises broadly two pairs of spaced pulse transmitters, one transmitter of each pair preferably although not necessarily having the same location, and a receiver for the pulses with the necessary timing equipment at the point to be located. The difference in arrival time of corresponding pulses from each pair of transmitters is measured. With this information and information as to the time relation of the corresponding pulses from each pair of transmitters a location may be established along two spherical hyperbolas having their foci at respective pairs of transmitters. The intersection of these hyperbolas will fix the position of the receiver.

Obviously each pair of stations must have corresponding pulses emitted in a fixed time relation known to the navigator at the receiver, that is the time delay between corresponding pulses must be maintained fixed. It follows as a corollary that the pulse emissions from each transmitter of a pair must have the same recurrence rate, and if the recurrence rate at the controlled or "slave" transmitter is held to that of the controlling or "master" transmitter once the time relation has been established. Each pair of transmitters may be identified by the navigator at the receiver, and he knowing the time relation may determine his position on the earth.

It is accordingly an object of this invention to provide apparatus for maintaining a recurrent series of pulse emissions from a first radio transmitter in a known time relation with a similarly recurrent series of pulse emissions from a second radio transmitter.

It is a further object of this invention to provide apparatus for maintaining a recurrent series of pulse emissions from a first radio transmitter in a known time relation with a similarly recurrent series of pulse emissions from a second radio transmitter by controlling the recurrence frequency of the first radio transmitter.

Other and further objects will be apparent during the course of the following description together with the accompanying drawings where:

Figure 3:
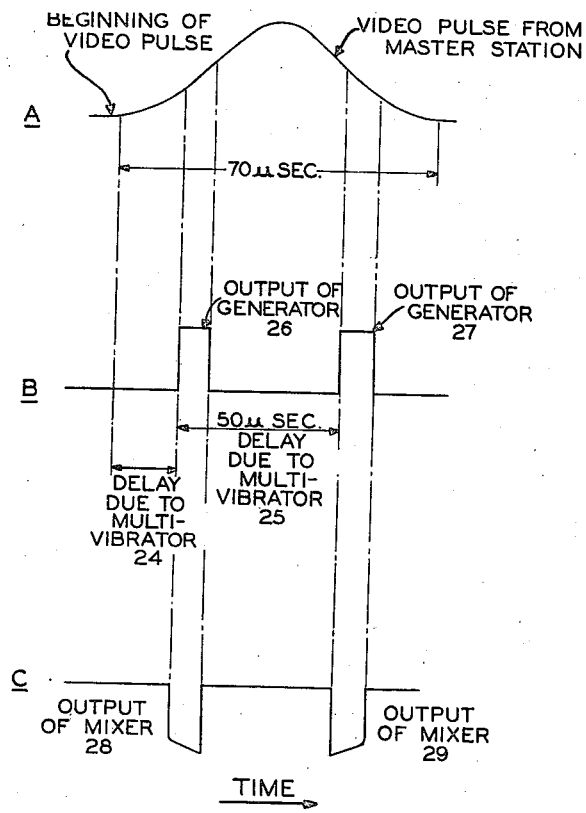

Fig. 3 discloses graphs of certain wave forms occurring in the invention.

Figure 1:
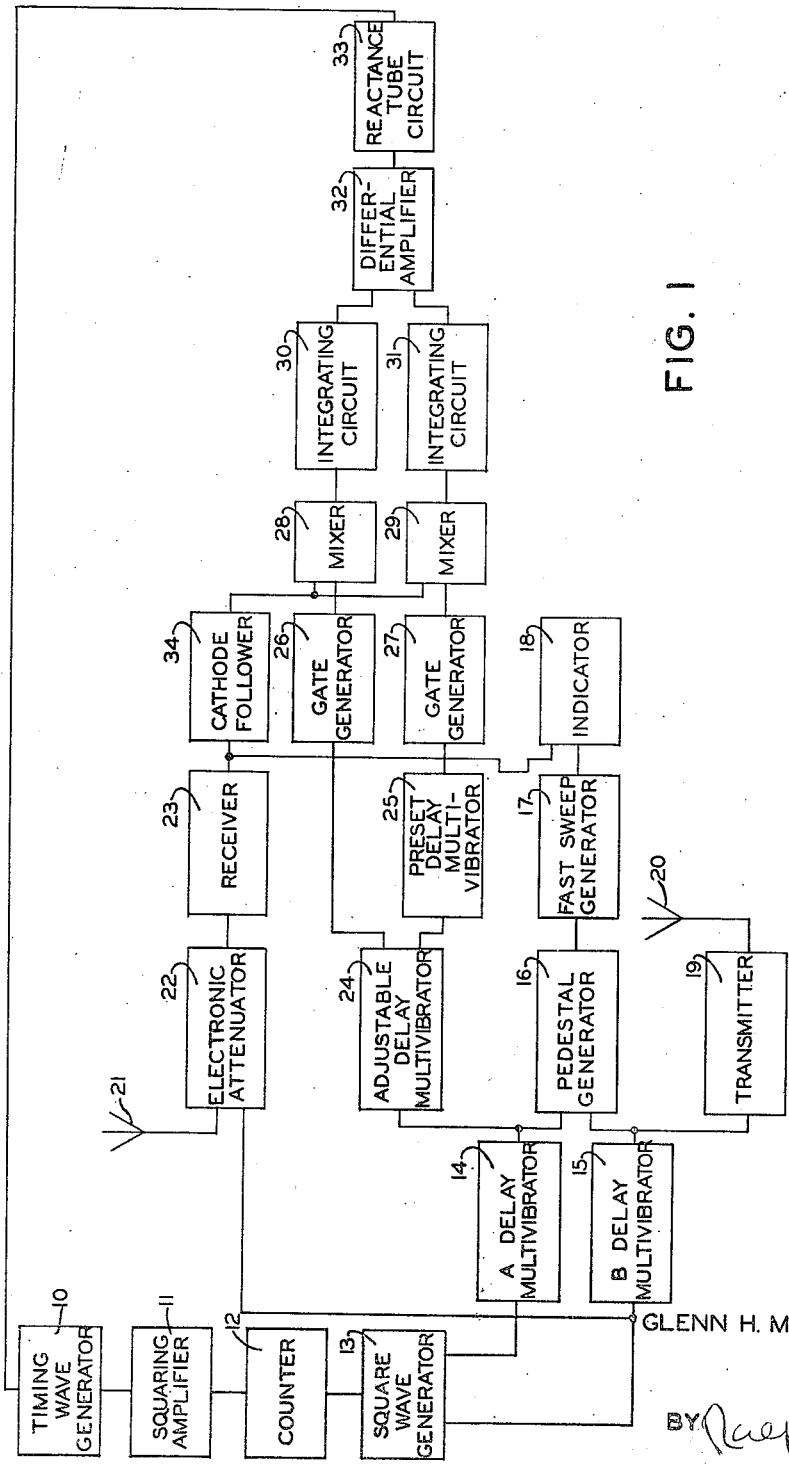
Fig. 1 is a block diagram of an embodiment of the invention.

The block diagram of Fig. 1 discloses the invention incorporated in a pulse transmitter of the type disclosed in the above-mentioned application. This transmitter is being used as a "slave," and will be described only in sufficient detail for comprehension of the principles of the instant invention, a more complete description being given in the above-mentioned application. A timing wave is obtained from a timing wave generator 10, which is controlled by a crystal which may although not necessarily, be kept in a constant temperate oven to insure an output extremely stable in frequency. The output from generator 10 after being squared in squaring amplifier 11 is applied to counter 12 where the frequency is reduced by the desired amount, say from 100 kilocycles to 50 cycles. The output of counter 12 is applied to square wave generator 13, which produces a square wave of one half the input frequency, namely 25 cycles. This square wave is conveyed to A delay multivibrator 14 and B delay multivibrator 15. Multivibrator 14 is triggered by the leading edge of the positive half of the square wave and multivibrator 15 is triggered by the leading edge of the negative half of the square wave. The delays of both multivibrators are adjustable over a range sufficient to permit the difference in time of occurrence between the outputs of the multivibrators to equal the known time interval. The trailing edges of multivibrators 14 and 15 are each utilized to trigger pedestal generator 16 which produces a rectangular voltage wave of a duration exceeding the width of the emission pulses. The leading and trailing edges of the pedestal wave are utilized to turn on and off respectively the sweep voltage of fast sweep generator 17 which is impressed on the horizontal plates of a cathode ray tube in indicator 18. Transmitter 19 is triggered in response to the trailing edge of the output wave of multivibrator 15, and a recurrent series of pulses are emitted from antenna 20, which are the "slave" signals. These pulse emissions as well as the series of pulse emissions from the "master" station are picked up by antenna 21. Electronic attenuator 22 operates in response to the output of square wave generator 13 to attenuate the "slave" pulse emission received with respect to the "master" pulse emission received, when the slave station is properly phased. This permits substantially equal pulse emissions from the "master" and "slave" stations to be applied to receiver 23. The output of receiver 23 is applied to the vertical plate of a cathode ray tube in indicator 18. With the slave station properly phased the pulses from the "master" and "slave" stations will appear on their respective sweeps in substantial coincidence, and will so remain if the recurrence frequency of the "slave" station is maintained the same as that of the "master" station. This recurrence frequency of the "slave" station may be maintained by manual adjustment, but an automatic adjustment is obviously more desirable.

To obtain an automatic adjustment the output of multivibrator 14 is also fed to an adjustable delay multivibrator 24 which has a delay range of 20 to 60 microseconds and which operates in response to the trailing edge of the wave from multivibrator 14. The outputs from multivibrator 24 are applied to two gate generators 26 and 27, one output being first passed through a 50 microsecond preset delay multivibrator 25 to further delay this output. Gate generators 26 and 27 each produce a narrow pulse of the order of 15 microseconds in response to the trailing edges of the output waves from multivibrators 24 and 25. These narrow pulses from their respective generators are impressed on mixers 28 and 29. The output video pulses from receiver 23 are also impressed on mixers 28 and 29 through cathode follower 34.

Mixers 28 and 29 whose circuits are described in more detail with reference to Fig. 2 produce each a pulse whose magnitude depends on the coincidence of the narrow pulses from gate generators 26 and 27 on the leading and trailing edges respectively of the video pulse. The mixers are rendered operative by the narrow pulses, and if a video pulse is also impressed on the mixers at this time, the output wave from the mixer will depend on the amplitude of the video pulse at this time. This may be seen more clearly in Fig. 3 where the A line represents a video pulse having a width of about 70 microseconds. The B line represents the narrow pulses applied to the mixer. Assuming the slave station is adjusted to proper phase, the time of occurrence of the leading narrow pulse from generator 26 will be determined by multivibrator 24, and the time of occurrence of the lagging narrow pulse from generator 27 with reference to the leading narrow pulse will be determined by multivibrator 25. The mixer outputs on line C are pulses occurring at the same times as the narrow pulses from generators 26 and 27 and have a magnitude depending on that of the video pulse at these times. Multivibrator 24 is adjusted to have the leading narrow pulse occur substantially on the mid-portion of the leading edge of the video pulse and multivibrator 25 is adjusted to have the lagging narrow pulse occur substantially on the mid-portion of the trailing edge of the video pulse. It is apparent that when the narrow pulses are symmetrical or coincident with respect to the video pulse, that is, when the narrow pulses occur on corresponding positions on the leading and trailing edges of the video pulse, the output pulses from the mixer will be equal assuming the mixers are balanced, but when the narrow pulses lead or lag from the symmetrical position, the output mixer pulses will be unequal. When the narrow pulses lead the video pulse the output of mixer 28 will be decreased and the output from mixer 29 will be increased, and vice versa.

Integrating circuits 30 and 31 are provided to produce each a relatively steady voltage depending on the magnitude of the output pulses from the respective mixers. To secure a voltage indication of the difference in the magnitudes of the steady voltages from the integrating circuits a differential amplifier 32 is used, whose output voltage will deviate from a reference level in an amount and direction determined by the difference in magnitude of steady voltages. The voltage from the differential amplifier controls a reactance tube circuit 33 by varying the reactance of this circuit in accordance with the magnitude of the voltage. The reactance of circuit 33 is in parallel with the tank circuit of the timing wave generator 10. A change in this reactance will be sufficient to pull the frequency of the timing wave in a direction depending on the direction of the reactance change.

Thus the frequency of the timing wave will be changed in accordance with any deviation of the narrow pulses produced by gate generators 25 and 27 from a symmetrical or coincident position in time with reference to the video pulse from the "master" station. The change in frequency will be in such a direction as to reduce the deviation, that is, to tend to restore the symmetrical position or coincidence, and the pulse emissions of the "slave" station will be substantially maintained in a desired and known time relation with the pulse emissions from the "master" station. Also the recurrence rate of the pulse emissions from the "slave" station will be maintained the same as the recurrence rate of the pulse emissions from the "master" station. The known time interval will in the main be determined by the delay settings of multivibrators 14 and 15 with due regard for the fact that multivibrator 15 is triggered later by one half cycle of square wave generator 13. Multivibrator 24 is adjustable over a relatively small range, and is used to compensate for the difference in time between the beginning of the "master" video pulse and the beginning of leading narrow pulse from generator 26.

Figure 2:
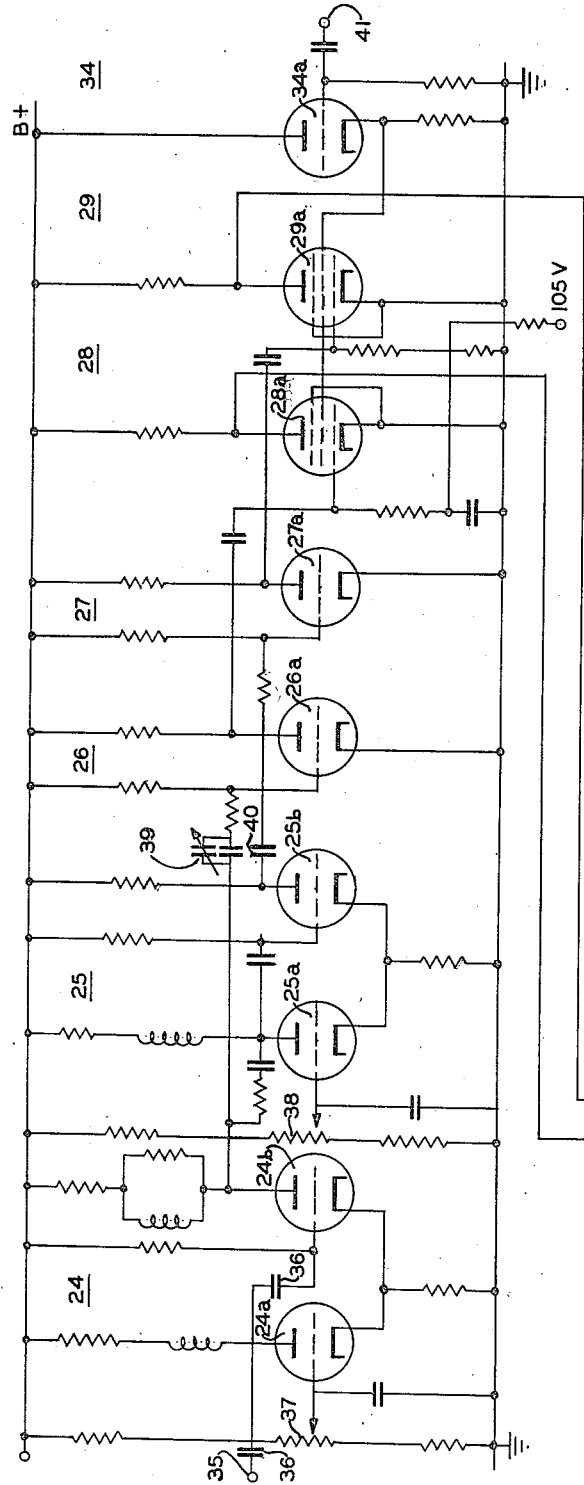
Fig. 2 is a circuit diagram showing details of certain blocks of Fig. 1.
Figure 2:
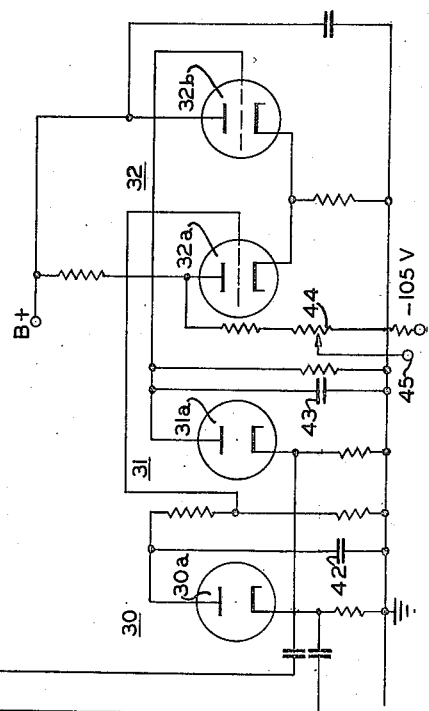

In the circuit diagram of Fig. 2 the voltage wave from multivibrator 14 is applied at terminal 35 connected through a peaking condenser 36 to adjustable delay multivibrator 24. This multivibrator is of a known type, and comprises two tubes 24a and 24b. Tubes 24a and 24b are normally in the non-conducting and conducting state respectively. A negative peaked voltage, corresponding to the trailing edge of the output wave from multivibrator 14, applied to the grid of tube 24b will bias this grid beyond cutoff to render tube 24b non-conducting. This will cause the cathode voltage of tube 24a to drop until this tube becomes conducting, with its plate potential dropping to maintain the grid of tube 24b biased below cutoff. This condition will persist until condenser 36 has charged sufficiently to permit the grid of tube 24b to rise above cutoff, when tube 24b once more conducts. The result of this cycle is a positive gate being impressed on preset delay multivibrator 25. The time required to charge condenser 36 is determined by the setting of potentiometer 37, which thus controls the delay setting of multivibrator 24.

Preset delay multivibrator 25 is similar in type to multivibrator 24 and operates in response to the negative trailing edge of the wave impressed thereon from multivibrator 24. Potentiometer 38 determines its delay setting. Narrow gate generators 26 and 27 have their tubes 26a and 27a normally in the conducting state. The outputs from multivibrators 24 and 25 are conveyed to the grids of these tubes through peaking condensers 39 and 40. The negative trailing edge of the waves from these multivibrators will produce a negative peak voltage at the grid of tubes 26a and 27a to bias them below cutoff to result in a narrow clipped positive pulse at the plate of each tube. Condenser 39 is made adjustable to permit proper balancing of the width of the respective narrow pulses.

These narrow pulses are applied to the respective grids of tubes 28a and 29a in mixers 28 and 29 to render these tubes conducting for the duration of the narrow pulse, the grids being normally biased beyond cutoff. The video pulse is applied in positive form at terminal 41 and after passing through cathode follower 34 is applied to the screens of both tubes 28a and 29a. If either or both of these tubes are in the conducting state due to the narrow pulses being impressed on their grids, the plate voltage of the tubes will drop further by an amount depending on the height of the video pulse at the occurrence of the narrow pulse applied to the particular tube. The negative voltage pulses at the plates of the tubes at 28a and 29a are impressed on their respective integrating circuits 30 and 31. Integrating circuit 30 includes a diode 30a and a condenser 42. The negative pulse impressed at the cathode of diode 30a flows therethrough to charge condenser 42. The rectifying action of the diode prevents the condenser from discharging except slowly through the resistors in series therewith. Thus the voltage impressed on the grid of tube 32a of differential amplifier 32 will be steady except for the slower change depending on the magnitude of the negative pulses from mixer 28. Integrating circuit 31 produces likewise a steady voltage dependent only on the magnitude of the negative pulses from mixer 29.

Since the voltage on the grid of tube 32a rises as the voltage on the grid of tube 32b falls and vice versa in differential amplifier 32, the voltage at the plate of tube 32a will rise and fall in accordance with the difference between the two grid voltages. This difference voltage is tapped off at the arm of potentiometer 44, whose resistance is connected between the plate of tube 32a and a negative potential. The arm is adjusted so that when the grids of tubes 32a and 32b have equal potentials, no potential exists between the arm and ground. When the potentials on these grids are unbalanced, a positive or negative direct voltage is conveyed to reactance tube circuit 33 connected to terminal 45 depending on the direction of the unbalance.

The level of the voltages fed to the differential amplifier will vary due to noise and fading. However, the difference of these voltages will remain reasonably stable during noise and fading, and be influenced mainly only by deviation in the "slave" station from the desired time relation. Since the voltage fed to reactance tube circuit 33 depends only on the difference in voltage levels, this invention has the advantage of reducing the adverse effects of noise and fading to a minimum.

The invention is to be limited only by the scope of the appended claims.

I claim:

1. A means for maintaining a recurring series of pulse emissions from a first radio transmitter in a known time relation with a similarly recurrent series of pulse emissions from a second radio transmitter comprising, means for generating a timing wave to control the recurrence rate of said first series of pulse emissions, means for producing a series of pairs of pulses of the same recurrence rate as said first pulse emissions, each pair of pulses leading the corresponding pulse of said first series of pulse emissions by said known time interval, and means responsive to the deviation of said pair of pulses from coincidence with the corresponding pulse of said second series of pulse emissions to control the frequency of said timing wave generating means to reduce said deviation.

2. A means for maintaining a recurrent series of pulse emissions from a first radio transmitter in a known time relation with a similarly recurrent series of pulse emissions from a second radio transmitter comprising, means for generating a timing wave to control the recurrence rate of said first series of pulse emissions, means for producing a series of pairs of pulses of the same recurrence rate as said first pulse emissions, each pair of pulses leading a corresponding pulse of said first series by said known time relation, means for producing a voltage depending on the deviation of said pair of pulses from a symmetrical occurrence with respect to the corresponding pulse of said second series of pulse emissions, and means responsive to said voltage to control the frequency of said timing wave generating means to reduce said deviation.

3. A means for maintaining a recurrent series of pulse emissions from a first radio transmitter in a known time relation with a similarly recurrent series of pulse emissions from a second radio transmitter comprising, means for generating a timing wave to control the recurrence rate of said first series of pulse emissions, means for producing a series of pairs of pulses of the same recurrence rate as said first pulse emissions, each pair of pulses leading the corresponding pulse of said first series of pulse emissions by the known time interval and each pair being separated in time less than the pulse width of said second series of pulse emissions, means producing a voltage depending on the deviation of said pair from a symmetrical position with respect to the leading and trailing edges of the corresponding pulse of said second series of pulse emissions, and a reactance tube circuit responsive to said voltage and operative to change the frequency of said timing wave generating means to reduce said deviation.

4. A means for maintaining a recurrent series of pulse emissions from a first radio transmitter in a known time relation with a similarly recurrent series of pulse emissions from a second radio transmitter comprising, a timing wave generator to control the recurrence rate of said first series of pulse emissions, means for producing a series of narrow pulses of the same recurrence rate as said first pulse emissions, means for producing a second series of narrow pulses, each pulse of the second series being delayed from the first series by an amount less than the pulse width of said second series of pulse emissions to produce a series of pairs of narrow pulses, each pair of narrow pulses leading by the known time relation the corresponding pulses of the first series of pulse emissions, a first mixer for said first series of narrow pulses and said second series of pulse emissions, a second mixer for said second series of narrow pulses and said second series of pulse emissions, the output of said first mixer being a pulse, the amplitude of which depends on the relative time of occurrence of a narrow pulse of said first series and a pulse of said second series of pulse emissions, the output of said second mixer being a pulse, the amplitude of which depends on the relative time of occurrence of a narrow pulse of said second series and a pulse of said second series of pulse emissions, the output pulses of said two mixers being of substantially equal amplitude when the undelayed and delayed narrow pulses in a pair occur in the leading and trailing edges, respectively, of a pulse of said second series of pulse emissions, first and second integrating circuits responsive to said outputs of said first and second mixers, respectively, each integrating circuit producing an output voltage depending on the magnitude of respective mixer output pulses, a differential amplifier to produce a voltage whose magnitude depends on the difference in magnitudes of the output voltages of said integrating circuits, a reactance tube circuit responsive to the output of said differential amplifier and adapted to control the frequency of said timing wave generator, whereby the frequency of said timing wave generator may be controlled in accordance with the occurrence of said pair of pulses on the leading and trailing edges of corresponding pulses of said second series of pulse emissions.

5. A system for maintaining a recurrent first series of pulse signals in a known time relation with a similarly recurrent second series of pulse signals comprising, means for generating said first series of pulse signals at substantially the same recurrence rate as said second series of pulse signals, means for generating a first signal of the same recurrence rate as said first series of pulse signals, said signal leading a corresponding pulse of said first series by said known time relation, a time interval measuring circuit having as input signals thereto said first signal and pulses in said second series for producing a second signal having a characteristic depending on the deviation of said first signal from the time of occurrence of a corresponding pulse of said second series of pulse emissions, and means responsive to said second signal to control the recurrence rate of said pulse generating means to reduce said deviation.

6. A means for maintaining a recurrent first series of pulse signals in a known time relation with a similarly recurrent second series of pulse signals comprising, means for generating a timing wave to control the recurrence rate of said first series of pulse signals, means for producing a first signal of the same recurrence rate as said first pulse signals, said signal leading a corresponding pulse of said first series by said known time relation, a time interval measuring circuit having as input signals thereto said first signal and pulses in said second series for producing a second signal having a characteristic depending on the deviation of said first signal from the time of occurrence of a corresponding pulse of said second series of pulse signals, and means responsive to said second signal for controlling the frequency of said timing wave generating means to reduce said deviation.

7. A means for maintaining a recurrent first series of pulse emissions in a known time relation with a similarly recurrent second series of pulse emissions, comprising means for generating a timing wave to control the recurrence rate of said first series of pulse emissions, means for generating said first series of pulse emissions in accordance with said timing wave, means for producing a first signal of the same recurrence rate as said first series, said signal leading a corresponding pulse of said first series by said known time relation, means for receiving said second series of pulse emissions, a time interval measuring circuit coupled to said first signal generating means and said second pulse series receiving means for producing a second signal having a characteristic depending on the deviation of said first signal from the time of occurrence of a corresponding pulse of said second series of pulse emissions, and means responsive to said second signal for controlling the frequency of said timing wave generating means to reduce said deviation.

8. A circuit for maintaining a recurrent first series of pulse signals in a known time relation with a similarly recurrent second series of pulse signals comprising, means for generating said first series of pulse signals at substantially the same recurrence rate as said second series of pulse signals, means for producing a first series of narrow pulses of the same recurrence rate as said first pulse signals, means for producing a second series of narrow pulses, each narrow pulse of said second series being spaced from a narrow pulse of said first series by an amount less than the pulse width of pulses in said second series of pulse signals to produce a series of pairs of narrow pulses, each pair of narrow pulses being spaced from a corresponding pulse of the first series of pulse signals by said known time, a first mixer receiving said first series of narrow pulses and said second series of pulse signals, a second mixer receiving said second series of narrow pulses and said second series of pulse signals, the output signal of each of said mixers being a series of pulses having substantially equal amplitude when the leading and trailing narrow pulses in a pair occur symmetrically in the leading and trailing edges, respectively, of a pulse of said second series of pulse signals, first and second integrating circuits responsive to said outputs of said first and second mixers, respectively, each integrating circuit producing an output voltage of a magnitude proportional to the amplitude of signals from the mixer associated therewith, a differential amplifier coupled to said integrating circuits for producing a voltage proportional to the difference in magnitudes of the signals from said two integrating circuits, and means coupling said differential amplifier to said means for generating said first series of pulse signals to control the interval between generated pulses.

9. A circuit for maintaining a recurrent first series of pulse signals in a known time relation with a similarly recurrent second series of pulse signals comprising, means for generating said first series of pulse signals at substantially the same recurrence rate as said second serise of pulse signals, means for producing a third series of narrow pulses of the same recurrence rate as said first pulse signals, means for producing a fourth series of narrow pulses, each pulse of said fourth series being spaced from a pulse in said third series by an amount less than the width of a pulse in said second series, a first mixer for combining pulses of said second and third series to produce a first signal having an amplitude dependent upon the relative time of occurrence of corresponding pulses in said second and said third series, a second mixer for combining pulses of said second and fourth series to produce a second signal having an amplitude dependent upon the relative time of occurrence of corresponding pulses in said second and fourth series, means for combining said first and second signals to produce a control signal of amplitude dependent on the relative amplitudes of said first and second signals, and means coupling said control signal to said means for generating said first series of pulse signals to control the interval between generated pulses, said control being in a direction to equalize said first and second signals.

10. A circuit for maintaining a recurrent first series of pulse emissions in a known time relation with a similarly recurrent second series of pulse emissions comprising, means for generating a timing wave to control the recurrence rate of said first series of pulse emissions, means for generating said first series of pulse emissions in accordance with said timing wave, means for producing a first signal of the same recurrence rate as said first series, said first signal comprising recurrent pairs of pulses, the midpoint in time of occurrence of each of said pairs being spaced from a corresponding pulse of said first series by said known time, means for receiving said second series of pulse emissions, a time interval measuring circuit coupled to said first signal producing means and said second pulse series receiving means for producing a second signal having a characteristic depending on the deviation of said midtime of said pairs of pulses from the time of occurrence of a corresponding pulse of said second series of pulse emissions, and means responsive to said second signal for controlling the frequency of said timing wave generating means to reduce said deviation.

GLENN H. MUSSELMAN.

References Cited in the file of this patent

UNITED STATES PATENTS

| Number | Name | Date |
|---|---|---|
| 2,425,981 | Bard et al. | Aug. 19, 1947 |